US011890953B2

(12) United States Patent
Hagen et al.

(10) Patent No.: US 11,890,953 B2
(45) Date of Patent: Feb. 6, 2024

(54) ELECTRIC ACCESSORY INTERFACE FOR WORK VEHICLE

(71) Applicant: Deere & Company, Moline, IL (US)

(72) Inventors: Skyler S. Hagen, Platteville, WI (US); Eric Vilar, Asbury, IA (US)

(73) Assignee: Deere & Company, Moline, IL (US)

( * ) Notice: Subject to any disclaimer, the term of this patent is extended or adjusted under 35 U.S.C. 154(b) by 465 days.

(21) Appl. No.: 17/215,077

(22) Filed: Mar. 29, 2021

(65) Prior Publication Data

US 2022/0305923 A1    Sep. 29, 2022

(51) Int. Cl.
*H02J 50/05*   (2016.01)
*B60L 53/122*  (2019.01)
*H02J 50/10*   (2016.01)

(52) U.S. Cl.
CPC ............ *B60L 53/122* (2019.02); *H02J 50/05* (2016.02); *H02J 50/10* (2016.02); *B60L 2200/40* (2013.01)

(58) Field of Classification Search
USPC .................. 320/106, 107, 108, 109, 110
See application file for complete search history.

(56) References Cited

U.S. PATENT DOCUMENTS 5,252,022 A   10/1993  Culp et al.
9,624,641 B2   4/2017  Martin et al.
(Continued)

FOREIGN PATENT DOCUMENTS

DE   102015216060 A1   2/2017
DE   102017116070 A1   1/2018
(Continued)

OTHER PUBLICATIONS

German Search Report issued in application No. DE102022201275.5 dated Nov. 2, 2022 (10 pages).

*Primary Examiner* — Brian Ngo
(74) *Attorney, Agent, or Firm* — Lucian Wayne Beavers; Patterson Intellectual Property Law, PC (57) ABSTRACT

An electrically powered work vehicle includes a work vehicle frame and a plurality of ground engaging units for supporting the work vehicle frame from a ground surface, at least one of the ground engaging units being powered by an electric drive motor to drive the vehicle. An electrical power storage system is carried by the work vehicle frame and connected to the electric drive motor to provide electrical power to the electric drive motor. A work tool coupler is carried by the work vehicle and configured to selectively interconnect the work vehicle with a coupler receiver of a selected one of a plurality of different work tools. A vehicle side electrical connector is carried by the work tool coupler and configured to transfer electrical power to the electrical power storage system to charge the electrical power storage system. Such a work vehicle may be used in combination with an external charging station. The external charging station may include an electrical power source, a coupler receiver configured to mechanically interconnect with the work tool coupler, and a charging station side electrical connector configured to electrically interconnect with the vehicle side electrical connector when the work tool coupler is mechanically interconnected with the coupler receiver. The charging side electrical connector is configured to connect the electrical power source to the vehicle side electrical connector.

17 Claims, 6 Drawing Sheets

(56) References Cited

U.S. PATENT DOCUMENTS 10,294,629 B1     5/2019   Sivaraman et al.
10,550,541 B1     2/2020   Diaz et al.

FOREIGN PATENT DOCUMENTS

| | | | | |
|---|---|---|---|---|
| DE | 102019200034 A1 | | 7/2020 | |
| DE | 102020006178 A1 | | 12/2020 | |
| JP | 2004098728 | * | 4/2004 | |
| TW | 201244972 A | * | 11/2012 | ................ B60L 1/00 |
| WO | WO2014106549 A2 | | 7/2014 | |

* cited by examiner

ELECTRIC ACCESSORY INTERFACE FOR WORK VEHICLE

FIELD OF THE DISCLOSURE

The present disclosure relates to electrically powered work vehicles including but not limited to a skid steer loader or a compact track loader.

BACKGROUND

Typical electrically powered work vehicles include a battery in place of the diesel engine and fuel supply of conventional fossil fuel powered work vehicles. To recharge the battery once depleted the human operator manually connects a power cable from an external energy source in order to energize an onboard charger. This manual connection during each charging cycle represents an inconvenience to the operator as well as wear and tear to the connectors and cables.

Accordingly, there is a continuing need for improved charging systems for such electrically powered work vehicles.

SUMMARY OF THE DISCLOSURE

In one embodiment an electrically powered work vehicle includes a work vehicle frame and a plurality of ground engaging units for supporting the work vehicle frame from a ground surface, at least one of the ground engaging units being powered by an electric drive motor to drive the vehicle. An electrical power storage system is carried by the work vehicle frame and connected to the electric drive motor to provide electrical power to the electric drive motor. A work tool coupler is carried by the work vehicle and configured to selectively interconnect the work vehicle with a coupler receiver of a selected one of a plurality of different work tools. A vehicle side electrical connector is carried by the work tool coupler and configured to transfer electrical power to the electrical power storage system to charge the electrical power storage system.

Such a work vehicle may be used in combination with an external charging station. The external charging station may include an electrical power source, a coupler receiver configured to mechanically interconnect with the work tool coupler, and a charging station side electrical connector configured to electrically interconnect with the vehicle side electrical connector when the work tool coupler is mechanically interconnected with the coupler receiver. The charging side electrical connector is configured to connect the electrical power source to the vehicle side electrical connector.

In other aspects of the disclosure, the electrical power transfer connection on the work vehicle provides an interface for other types of electrical accessories such as electrically powered work tools.

Numerous objects, features and advantages of the present invention will be readily apparent to those skilled in the art upon a review of following description in conjunction with the accompanying drawings.

DETAILED DESCRIPTION

Figure 1:
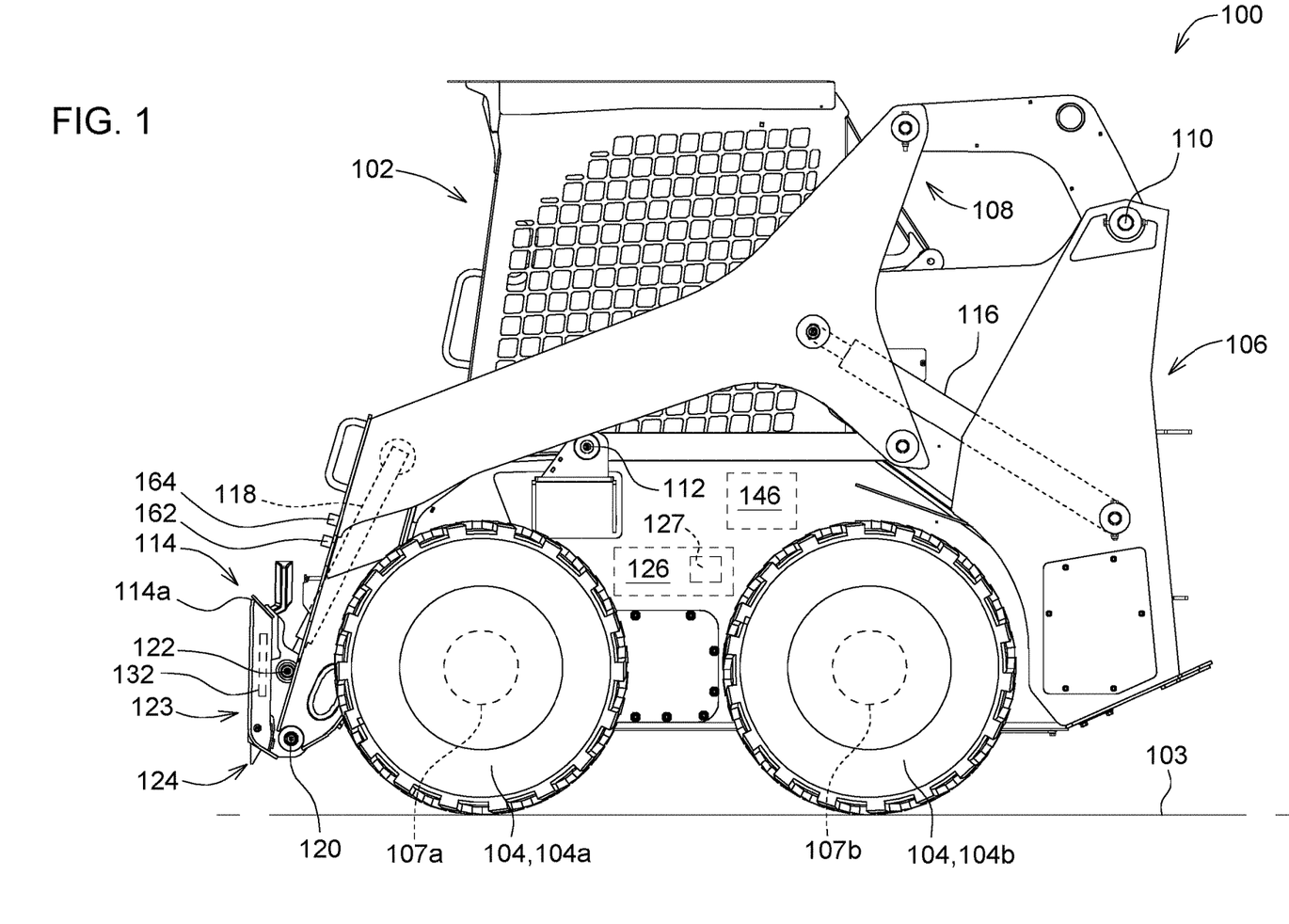
FIG. 1 is a left side view of an electrically powered work vehicle, for example a skid steer loader, with a work tool coupler connected to the front of the work vehicle.

FIG. 1 is a left side view of an electrically powered work vehicle 100. Work vehicle 100 is illustrated as a skid steer loader, which may also be referred to a skid steer, but may be any work vehicle which may connect to a work tool with a retention assembly, such as backhoe loader, compact track loader, excavator, tractor, tractor loader, and wheel loader, to name a few examples. Work vehicle 100 may perform a number of work operations, including excavating or loading material, shaping or smoothing ground surfaces, excavating or boring a hole, or breaking up a material, to name but a few operations. As used herein, directions with regard to work vehicle 100 may be referred to from the perspective of an operator seated within operator station 102: the left of work vehicle 100 is to the left of such an operator, the right of work vehicle 100 is to the right of such an operator, the front or fore of work vehicle 100 is the direction such an operator faces, the rear or aft of work vehicle 100 is behind such an operator, the top of work vehicle 100 is above such an operator, and the bottom of work vehicle 100 is below such an operator.

Work vehicle 100 is supported from or on the ground surface 103 by ground engaging units 104, which provide rolling support to work vehicle frame 106 and traction. The ground engaging units 104 may be wheels as shown in FIG. 1, or alternatively may be crawler track units. In the example shown in FIG. 1, the ground engaging units 104 include front and rear left side ground engaging units 104a and 104b, and front and rear right side ground engaging units which are not visible in the figure. Collectively the ground engaging units may be referred to as the ground engaging units 104. At least one of the ground engaging units, and preferably all of the ground engaging units are powered by individual electric drive motors 107a, 107b, etc., to drive the work vehicle 100. Collectively the electric drive motors may be referred to as the electric drive motors 107.

Figure 2:
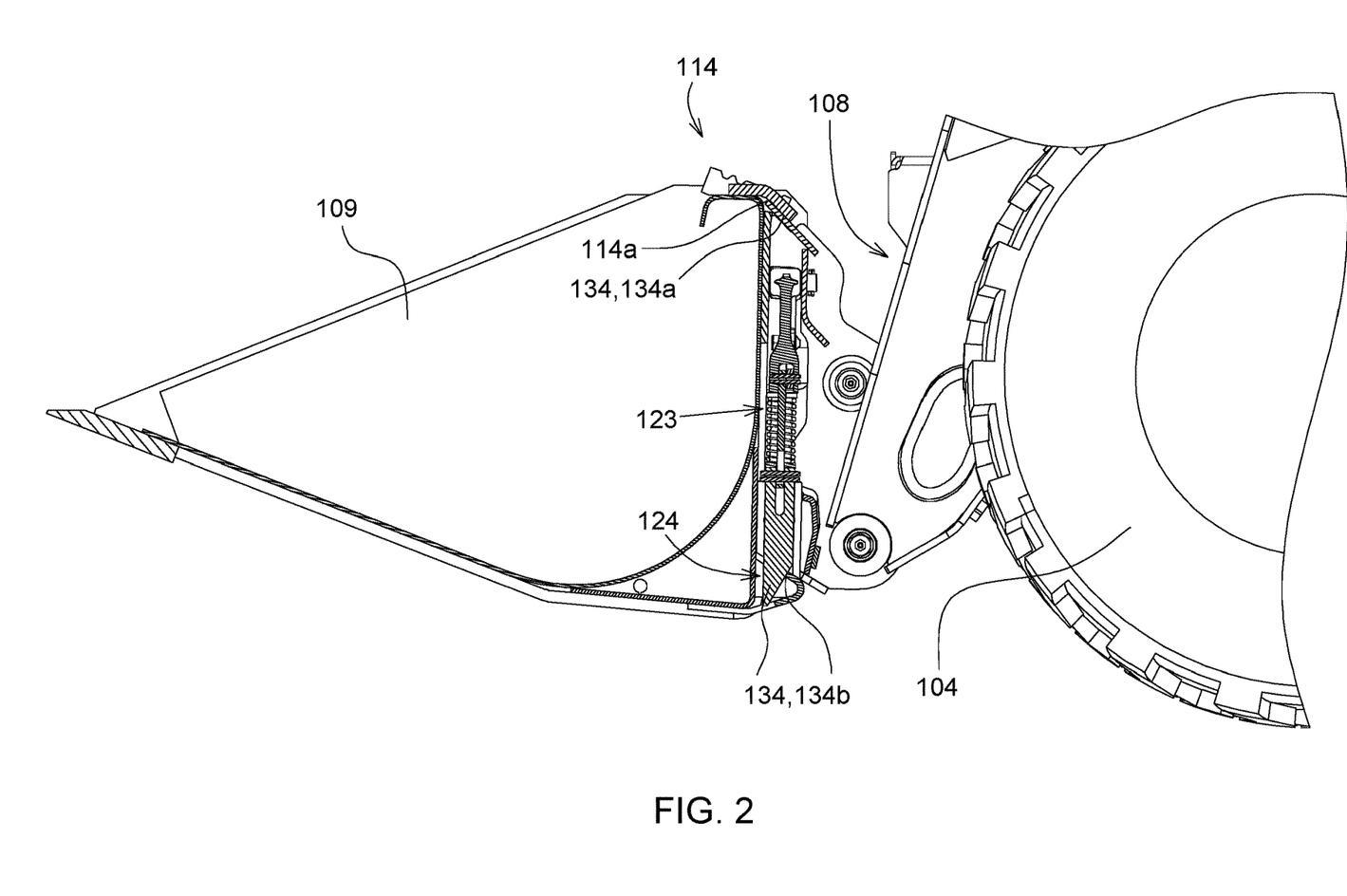
FIG. 2 is an enlarged left side view of the front portion of the work vehicle with the work tool coupler engaged with a coupler receiver of a work tool, which in the illustrated example is a bucket.

Work vehicle frame 106 provides strength and support to work vehicle 100, and interconnects the components of work vehicle 100, including boom 108. Boom 108, which may also be referred to as a linkage, is pivotally connected to work vehicle frame 106 via pins 110 and pins 112. These pivotal connections allow work vehicle 100 to raise and lower boom 108, which in turn raises and lowers a work tool coupler 114 and any work tools attached to the work tool coupler 114. In FIG. 2 the work tool coupler 114 is shown attached to an exemplary work tool 109 in the form of a bucket. Work vehicle 100 may raise and lower boom 108 via the extension and retraction of double-acting lift hydraulic cylinders 116.

As is further described below regarding the hydraulic schematic diagram of FIG. 7 each hydraulic cylinder 116 may be controlled by a hydraulic control valve 117 supplied with hydraulic fluid from a hydraulic pump 148. Work tool coupler 114 may also be tilted relative to boom 108 by tilt cylinders 118, controlled by hydraulic control valves such as 119. These hydraulic actuators 116, 118 allow the work tool 109 attached to work tool coupler 114 to perform a function, such as a bucket 109 which may be tilted upwards to gather material or downwards to dump material.

Work tool coupler 114 is pivotally connected at one longitudinal end of boom 108 via pins 120 and is pivotally connected at one longitudinal end of each of tilt cylinders 118 by pins 122. Work tool coupler 114 may thereby transmit forces between a work tool 109 attached to work tool coupler 114, boom 108, and tilt cylinders 118, allowing the work tool 109 to be raised, lowered, and tilted relative to work vehicle frame 106. Work tool coupler 114 includes body 123, the rigid structure which provides strength and carries forces for work tool coupler 114, and latch 124, which aids in retaining and securing the work tool 109 to coupler 114.

In the embodiment illustrated in FIG. 1, body 123 is a weldment where multiple steel components are joined together by welds. In alternative embodiments, body 123 may be configured differently, including as a casting with no welding or joining operations, with components joined by structural adhesives, or with components joined by fasteners, to name but a few examples. Body 123 provides the rigid structure for work tool coupler 114, and thereby carries the necessary forces, provides rigidity and strength, and provides attachment points for the other components of work tool coupler 114.

Latch 124 is comprised of multiple interlinked components which allow work tools to be retained in an engaged position with work tool coupler 114, such as when work vehicle 100 is operating with the work tool 109, or released from engagement, such as when a work tool 109 is being exchanged for another work tool. Latch 124 may be referred to as engaged, or in an engaged position, when it is retaining a work tool, and may be referred to as disengaged, or in a disengaged position, when it is not retaining a work tool. Latch 124 may also take on positions intermediate to the engaged and disengaged positions, such as occurs when it is being actuated between engagement and disengagement. Latch 124 may be either manually operated or may be hydraulically or electrically operated remotely by the human operator located in the operator's station 102. Further details of construction of a manually actuated version of latch 124 are found in U.S. Pat. No. 9,624,621, the details of which are incorporated herein by reference.

Examples of other configurations for a work tool coupler with associated coupler receiver and latching mechanisms can be see in U.S. Pat. Nos. 5,252,022; 10,550,541; and 10,294,629, the details of which are incorporated herein by reference.

An electrical power storage system, schematically indicated as 126 in FIG. 1, is carried by the work vehicle frame 106 and is connected to the electric drive motors 107 to provide electrical power to the electric drive motors. Electrical power storage system 126 may include at least one rechargeable battery 127. Alternatively, other energy storage devices such as capacitive storage may be included.

The work tool coupler 114 is configured to selectively interconnect the work vehicle 100 with a coupler receiver 128 of a selected one of a plurality of different work tools 109 such as the bucket 109 shown in FIG. 2. The work tools may be non-powered tools such as the bucket 109. The work tools may also be electrically or hydraulically powered work tools. As is further described below with regard to the hydraulic schematic of FIG. 7, hydraulic power may be provided to such work tools via the vehicle side hydraulic connections 162 and 164.

Figure 8:
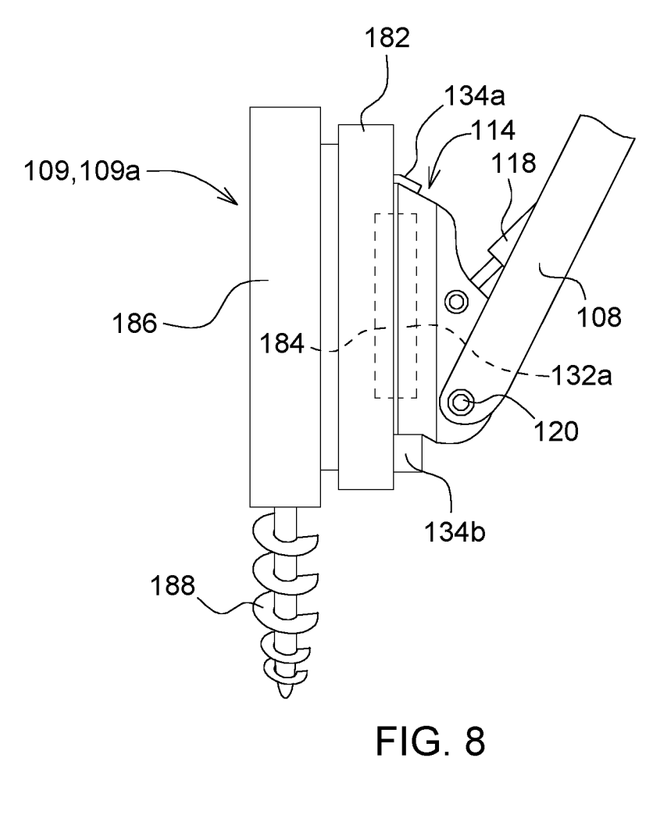
FIG. 8 schematically illustrates the work vehicle operatively engaged with an electrically powered work tool.

Also as shown in FIG. 8, a vehicle side electrical connector associated with the work tool coupler 114 may also be used to provide electrical power to an electrically powered work tool 109. Examples of electrically powered work tools include augers and claw buckets.

The vehicle side electrical connector 132 is schematically shown in FIG. 1 and is carried by the work tool coupler 114 and configured to transfer electrical power to the electrical power storage system 126 to charge the electrical power storage system 126. The vehicle side electrical connector 132 is arranged relative to the work tool coupler 114 such that mechanical interconnection of the work tool coupler 114 with a coupler receiver 134 of an external charging station 136 defines a translational alignment and a proximity of the vehicle side electrical connector 132 relative to a charging station side electrical connector 138 of the external charging station 136. Thus when the work tool coupler 114 is interconnected with the coupler receiver 134 of the external charging station 136 the vehicle side electrical connector provides electrical power from the external charging station 136 to the electrical power storage system 126. Optionally, if the vehicle side electrical connector 132 is constructed as a bi-directional connector the work tool coupler 114 can be connected to a coupler receiver of an electrically powered work tool 109 to transfer electrical power from the electrical power storage system 126 to the electrically powered work tool 109.

The coupler receiver 134 may for example be constructed as shown in FIG. 2, and as further described in U.S. Pat. No. 9,624,621, and may include an upper lip portion 134a and a lower cavity portion 134b for engaging with an upper edge 114a of work tool coupler 114 and the latch 124, respectively.

Figure 3:
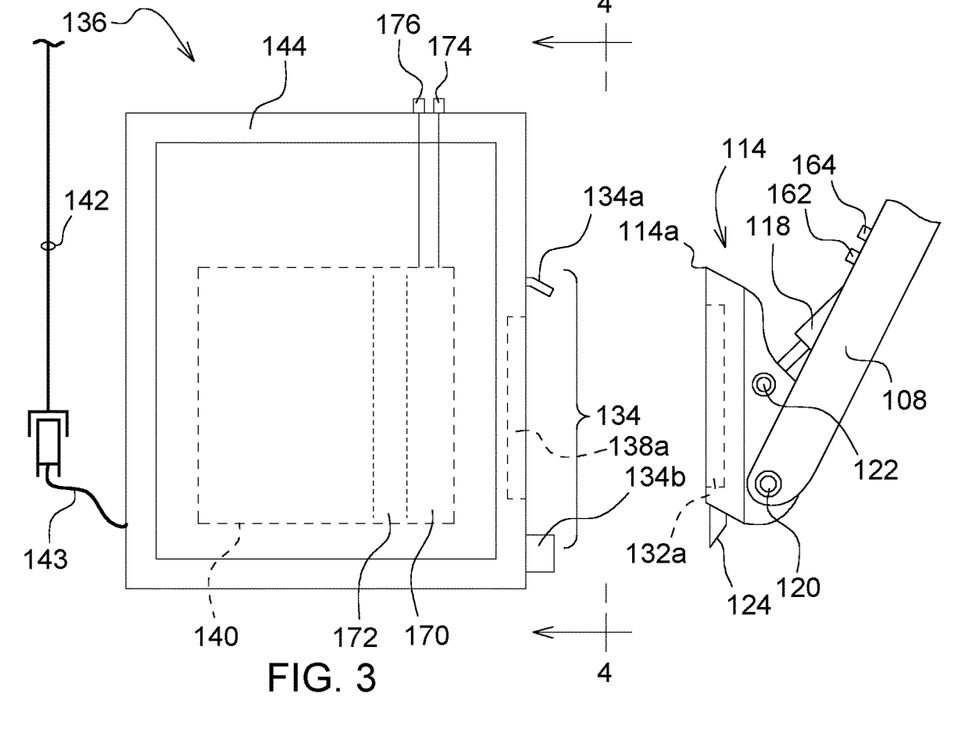
FIG. 3 is a schematic left side view of the front portion of the work vehicle showing the work tool coupler juxtaposed relative to an external charging station. A vehicle side electrical connector and a charging station side electrical connector are schematically shown in the form of wireless power transfer connectors.
Figure 4:
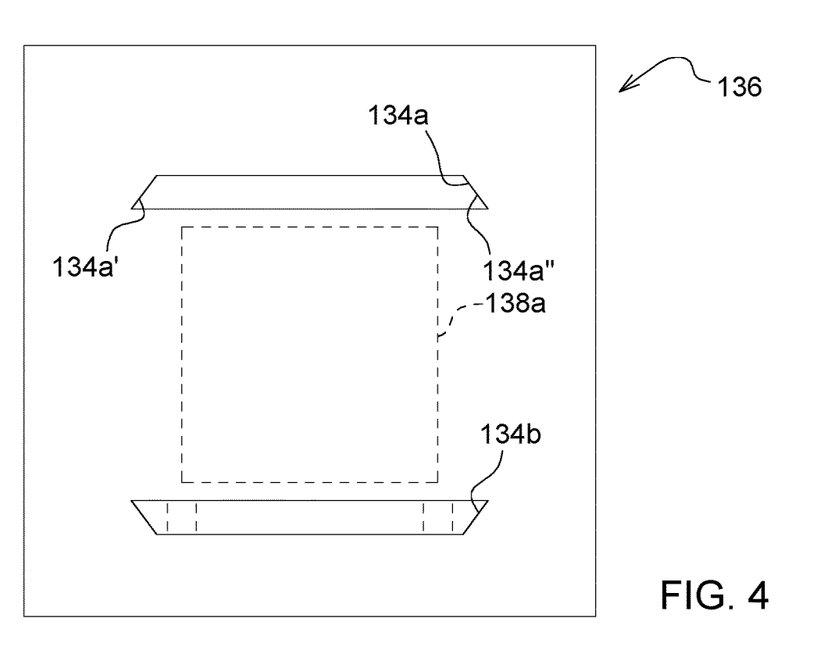
FIG. 4 is a schematic view taken along line 4-4 of FIG. 3 showing an elevation view of the coupler receiver of the external charging station.

In one embodiment as schematically illustrated in FIGS. 3 and 4, the vehicle side electrical connector 132 and the charging station side electrical connector 138 are wireless power transfer connectors 132a and 138a. The wireless power transfer connectors 132a and 132b may be configured either for inductive power transfer or for capacitive power transfer. The wireless power transfer connectors 132a and 138a preferably are small-air-gap wireless power transfer connectors. By incorporating the wireless power transfer connectors 132a and 138a in the work tool coupler 114 and the coupler receiver 134 those connectors can be reliably placed and held in the close proximity needed for small-air-gap power transfer.

Figure 5:
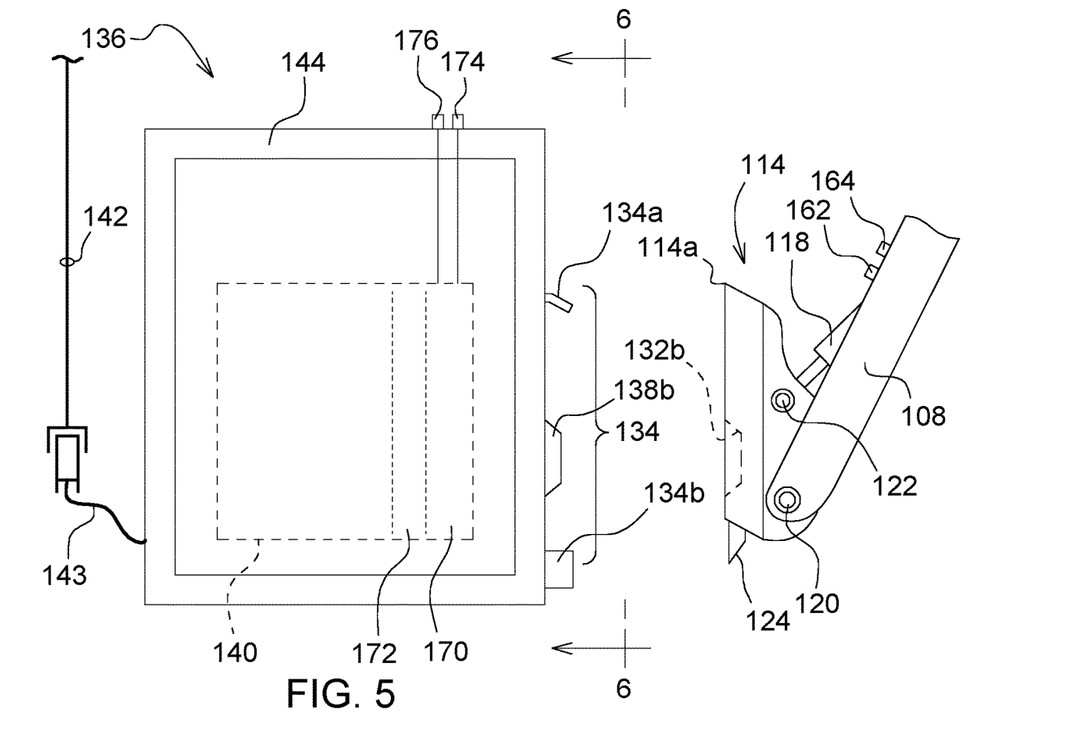
FIG. 5 is a schematic view similar to FIG. 3 but in which the vehicle side electrical connector and a charging station side electrical connector are schematically shown in the form of galvanic power transfer connectors.
Figure 6:
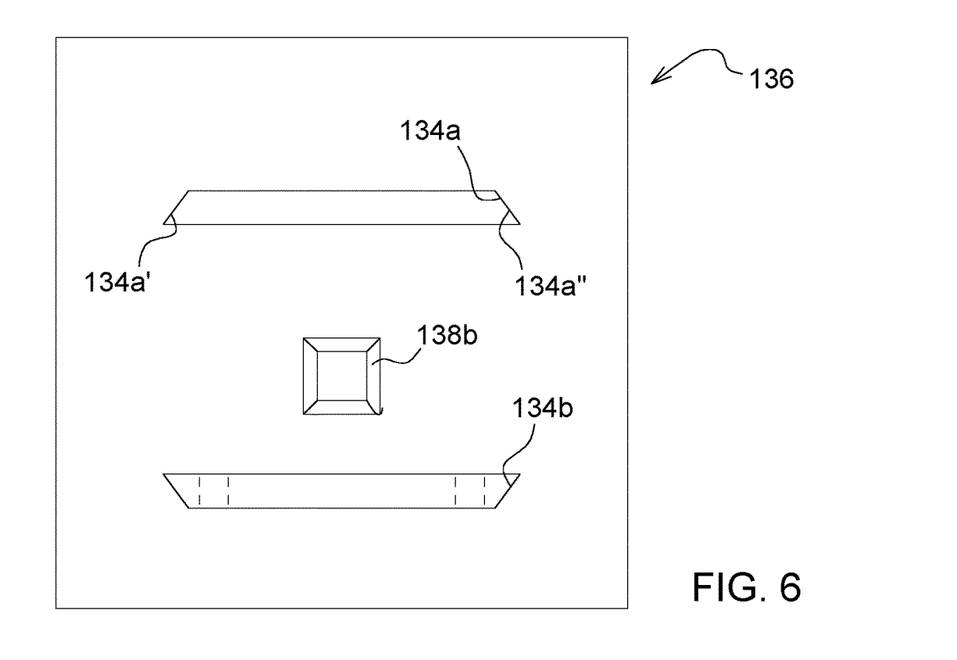
FIG. 6 is a schematic view taken along line 6-6 of FIG. 5 showing an elevation view of the coupler receiver of the external charging station of FIG. 5.

In another embodiment as schematically illustrated in FIGS. 5 and 6, the vehicle side electrical connector 132 and the charging station side electrical connector 138 are galvanic power transfer connectors 132b and 138b. Galvanic power transfer connectors are those providing physical engagement of electrical conductors such as plug in type connections.

The external charging station 136 further includes an electrical power source 140, which may for example be an AC/DC converter which converts alternating current from an AC power grid 142 into direct current for charging the battery 127 of the electrical power storage system 126. The external charging station 136 further includes a charging station frame 144 and the coupler receiver 134 is attached to the charging station frame 144 such that when the work tool coupler 114 is mechanically interconnected with the coupler receiver 134 the work vehicle is configured to lift the external charging station 136 and transport the external charging station 136.

In one embodiment the work vehicle 100 may be an all electric powered work vehicle 100 which does not include any hydraulically powered components. In this embodiment the various actuators such as 116 and 118 may be electrically powered actuators.

In another embodiment the work vehicle 100 may include hydraulically powered components. For example, in this embodiment the actuators 116 and 118 may be hydraulic cylinders. In this embodiment the work vehicle 100 may include an electrically powered hydraulic power supply 146 configured to provide hydraulic power to hydraulic components such as 116 and 118 of the work vehicle 100.

Figure 7:
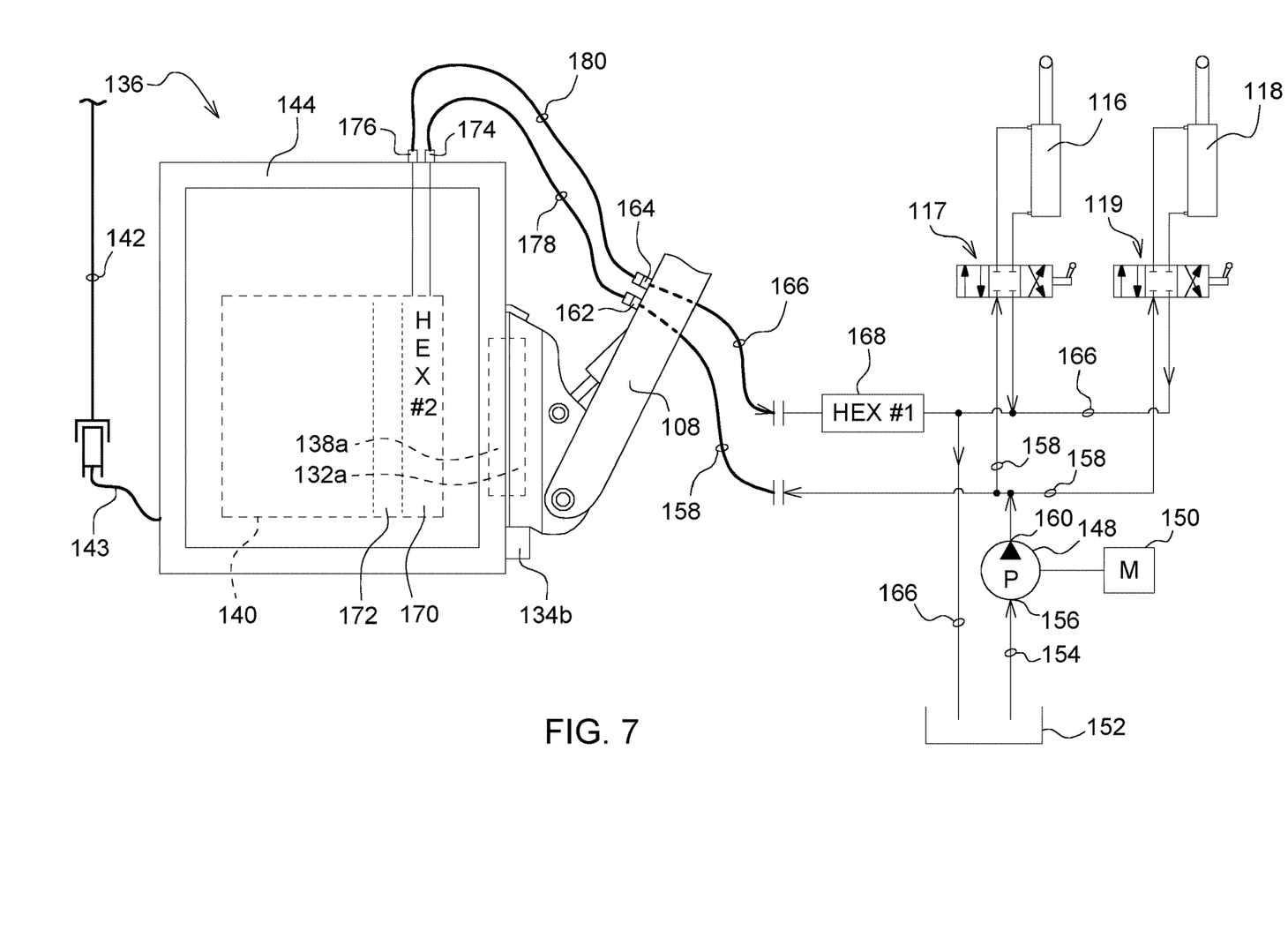
FIG. 7 is a schematic hydraulic diagram of the hydraulic components of the work vehicle and the external charging station in an optional embodiment which provides for cooling of the power electronics of the external charging station with hydraulic fluid circulated from the hydraulic system of the work vehicle.

The hydraulic power supply 146 is schematically shown in FIG. 7. Hydraulic power supply 146 may include a hydraulic pump 148 driven by an electric motor 150 which receives its electrical power from the electrical power storage system 126. A tank 152 provides a reservoir of hydraulic fluid on the work vehicle 100. An intake passage 154 connects the tank 152 to a pump inlet 156. A supply passage 158 connects a pump outlet 160 to the various hydraulically powered components and also to a vehicle side hydraulic fluid supply connection 162 which may be located on an outer portion of the boom 108 near the work tool coupler 114 or on the work tool coupler 114 itself. Also located adjacent the hydraulic fluid supply connection 162 is a vehicle side hydraulic fluid return connection 164 which is connected to a hydraulic fluid return passage 166. The hydraulic fluid return passage 166 connects the hydraulic fluid return connection 164 and the low pressure side of the various hydraulically powered components such as the control valves 117 and 119 associated with hydraulic actuators 116 and 118 to the tank 152.

As previously noted the vehicle side hydraulic fluid supply connection 162 and the vehicle side hydraulic fluid return connection 164 provide the ability to provide hydraulic power to a hydraulically powered work tool 109 attached to the work tool coupler 114.

The vehicle side hydraulic fluid supply connection 162 and the vehicle hydraulic fluid return connection 164 also provide the ability to provide a cooling system for the electronic components of the external charging station 136. In such an embodiment a first heat exchanger 168 is provided in the hydraulic fluid return passage 166 between the vehicle side hydraulic fluid return connection 164 and the tank 152 to cool hydraulic fluid flowing through the hydraulic power supply and particularly to cool hydraulic fluid returning from the vehicle side hydraulic fluid return connection 164. First heat exchanger 168 may be an external fin tube heat exchanger in the form of a hydraulic oil cooler/radiator which transfers heat from hot hydraulic fluid flowing through an internal passage of the heat exchanger 168 to cooler air flowing past external fin tubes of the heat exchanger 168.

As schematically shown in FIGS. 3 and 7, the external charging station 136 may include a second heat exchanger 170 configured to transfer heat generated by power electronics 172 associated with the electric power source 140 to hydraulic fluid from the hydraulic fluid supply connection 162 which fluid is circulated through the second heat exchanger 170. The second heat exchanger 170 may be in the form of a cold plate having the power electronics 172 mounted thereon and having internal cooling passages through which the hydraulic fluid flows. The internal passage of the second heat exchanger 170 may be connected to charging station side hydraulic fluid supply connection 174 and charging station side hydraulic fluid return connection 176.

As shown schematically in FIGS. 3 and 7, when the work tool coupler 114 is mechanically and electrically connected to the coupler receiver 134, the vehicle side hydraulic fluid supply and return connections 162 and 164 may be connected to the charging station side hydraulic fluid supply and return connections 174 and 176 by flexible supply and return lines 178 and 180, respectively. The connections 162, 164, 174 and 176 may all be suitable quick connects and the supply and return lines 178 and 180 may have compatible quick connects on each end.

The hydraulic cooling option just described for the external charging station 136 provides an arrangement to cool a fast-charger type of external charging station 136. In a fast charger embodiment the external charging station 136 would contain the power electronics 172 which would be processing multiple tens of kilowatts of power, and the losses in the power electronics 172 would generate heat which would be difficult to remove by air-cooling, especially in dirty work environments where fans and cooling fins are impractical. Instead, the power electronic 172 inside the external charging station 136 would be mounted to the "cold plate" heat exchanger 170 which contains channels for hydraulic fluid to flow through. Hydraulic fluid would loop from the vehicle side hydraulic fluid supply connection 162 on the work vehicle 100, through the "cold plate" heat exchanger 170 and back to the vehicle side hydraulic fluid return connection 164 cooling the power electronics 172 by absorbing heat into the fluid. The hot fluid would then pass through the first heat exchanger 168 which may be in the form of a hydraulic oil cooler/radiator on the work machine 100 to cool the fluid back down; thus circulating in a loop. This would require the electric powered hydraulic pump 148 on the work vehicle 100 to be running during charging; however because there is minimal pressure drop in the cold plate heat exchanger 170, and no work is being done by the fluid, the hydraulic pumping power requirement for pump 148 would be minimal.

FIG. 8 schematically illustrates the use of the work vehicle 100 as described above having the wireless power transfer connector 132a, in combination with an electrically powered work tool 109 in the form of an electrically powered auger 109a. The electrically powered auger 109a includes a mounting frame 182 which carries the coupler receiver 134a, 134b and a tool side wireless power transfer connector 184. The tool side wireless power transfer connector 184 is constructed similarly to the charging station side wireless power transfer connector 138a. Galvanic connectors may also be used instead of the wireless power transfer connectors. An electric auger motor 186 is carried on the mounting frame 182 and drives a rotating auger blade 188. Electrical power from the electrical power storage system 126 is transferred to the electric auger motor 186 via the operative electrical connection between connectors 132*a* and 184.

The system disclosed herein provides many advantages. By incorporating the electrical connections to the electrical power storage system 126 into the work tool coupler 114 the operator can drive up to the external charging station 136, engage the work tool coupler 114 with the coupler receiver 134 of the external charging station 136, and then lock the external charging station 136 to the work tool coupler 114 using either manual or powered latches 124. The electrical connection between vehicle side electrical connector 132 and charging station side electrical connector 138 is automatically made and the translational alignment and proximity of the electrical connectors 132, 138 is insured by the mechanical interconnection of the work tool coupler 114 and the coupler receiver 134. As schematically seen in FIGS. 4 and 6 for example, the upper portion 134*a* of the coupler receiver 134 may include tapered guiding portions 134*a*' and 134*a*'' which guide the upper edge 114*a* of work tool coupler 114 to insure the translational alignment of the work tool coupler 114 with the coupler receiver 134 across the width of the mechanical interconnection. There is no need for the operator of the work vehicle 100 to leave the operator station 102 to manually connect a power supply plug.

The external charging station 136 can be left semi-permanently connected to the AC power grid 142 at the charging location using the flexible AC supply cable 143.

When it is desired to move the external charging station 136 the mechanical connection of the work tool coupler 114 and the coupler receiver 134 allow the work vehicle 100 to lift the external charging station 136 and move it to another location.

Connector plugging operation is not required at each charging cycle, thus mitigating wear and tear on connectors and cables, and mitigating corrosion concerns due to open un-mated connectors.

Use of the optional hydraulic cooling arrangement for the power electronics of the external charging station use of fast-charger technology for the external charging station.

Use of the optional bi-directional embodiment for the vehicle side electrical power transfer connection allows the use of that same connection to power electrically powered work tools.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. An electrically powered work vehicle, comprising:
    a work vehicle frame;
    a plurality of ground engaging units for supporting the work vehicle frame from a ground surface, at least one of the ground engaging units being powered by an electric drive motor to drive the vehicle;
    an electrical power storage system carried by the work vehicle frame and connected to the electric drive motor to provide electrical power to the electric drive motor;
    a work tool coupler carried by the work vehicle and configured to selectively interconnect the work vehicle with a coupler receiver of a selected one of a plurality of different work tools; and
    a vehicle side electrical connector carried by the work tool coupler and configured to transfer electrical power to the electrical power storage system to charge the electrical power storage system;
    wherein vehicle side electrical connector is a wireless power transfer connector, and
    wherein the wireless power transfer connector is bi-directional so that electrical power can be transferred to the electrical power storage system to charge the electrical power storage system, and electrical power can be transferred from the electrical power storage system to an electrically powered tool operably engaged with the work tool coupler.

2. The electrically powered work vehicle of claim 1, wherein:
    the vehicle side electrical connector is arranged relative to the work tool coupler such that mechanical interconnection of the work tool coupler with a coupler receiver of an external charging station defines a translational alignment and a proximity of the vehicle side electrical connector relative to a charging station side electrical connector of the external charging station.

3. The electrically powered work vehicle of claim 1, wherein:
    the wireless power transfer connector is configured for inductive power transfer.

4. The electrically powered work vehicle of claim 1, wherein:
    the wireless power transfer connector is a small-air-gap wireless power transfer connector.

5. The electrically powered work vehicle of claim 1, wherein:
    the vehicle side electrical connector is a galvanic contact power transfer connector.

6. The electrically powered work vehicle of claim 1, wherein:
    the electrical power storage system includes at least one rechargeable battery.

7. The electrically powered work vehicle of claim 1, wherein:
    the work tool coupler includes a latch configured to latch the work tool coupler to the coupler receiver; and
    the work vehicle includes an operator's station and the latch is remotely operable by a human operator located in the operator's station.

8. The electrically powered work vehicle of claim 1, wherein the work vehicle is an all electric powered work vehicle.

9. The electrically powered work vehicle of claim 1, wherein the work vehicle is either a skid steer loader or a compact track loader.

10. The electrically powered work vehicle of claim 1, further comprising:
    a boom articulated relative to the work vehicle frame; and
    wherein the work tool coupler and the vehicle side electrical connector are carried by the boom.

11. The electrically powered work vehicle of claim 1, in combination with an external charging station, the external charging station comprising:
    an electrical power source;

a coupler receiver configured to mechanically interconnect with the work tool coupler; and a charging station side electrical connector configured to electrically interconnect with the vehicle side electrical connector when the work tool coupler is mechanically interconnected with the coupler receiver, wherein the charging side electrical connector is configured to connect the electrical power source to the vehicle side electrical connector.

12. The electrically powered work vehicle in combination with the external charging station as recited in claim 11, wherein:

the vehicle side electrical connector is arranged relative to the work tool coupler, and the charging station side electrical connector is arranged relative to the coupler receiver, such that mechanical interconnection of the work tool coupler with the coupler receiver defines a translational alignment and a proximity of the vehicle side electrical connector relative to the charging station side electrical connector.

13. The electrically powered work vehicle in combination with the external charging station as recited in claim 11, wherein:

the work vehicle includes an electrically powered hydraulic power supply configured to provide hydraulic power to hydraulic components of the work vehicle, the hydraulic power supply including vehicle side hydraulic fluid supply and return connections, the hydraulic power supply including a first heat exchanger configured to cool hydraulic fluid returning from the vehicle side return connection to the hydraulic power supply;

the external charging station includes a second heat exchanger configured to transfer heat generated by electronic components of the external charging station to hydraulic fluid flowing through the second heat exchanger; and the charging station further includes charging station side hydraulic fluid supply and return connections configured to be hydraulically connected with the vehicle side hydraulic fluid supply and return connections so that hydraulic fluid from the hydraulic power supply of the work vehicle can be circulated through the first and second heat exchangers to cool the electronic components of the external charging station as the external charging station is charging the electrical power storage system of the work vehicle.

14. The electrically powered work vehicle in combination with the external charging station as recited in claim 11, wherein:

the external charging station includes a charging station frame and the coupler receiver is attached to the charging station frame such that when the work tool coupler is mechanically interconnected with the coupler receiver the work vehicle is configured to lift the external charging station and transport the external charging station.

15. The electrically powered work vehicle in combination with the external charging station as recited in claim 11, wherein:

the external charging station is configured to be connected to an AC power grid.

16. An electrically powered work vehicle, comprising:

a work vehicle frame;

a plurality of ground engaging units for supporting the work vehicle frame from a ground surface, at least one of the ground engaging units being powered by an electric drive motor to drive the vehicle;

an electrical power storage system carried by the work vehicle frame and connected to the electric drive motor to provide electrical power to the electric drive motor;

a work tool coupler carried by the work vehicle and configured to selectively interconnect the work vehicle with a coupler receiver of a selected one of a plurality of different work tools;

a vehicle side electrical connector carried by the work tool coupler and configured to transfer electrical power to the electrical power storage system to charge the electrical power storage system; and an electrically powered hydraulic power supply configured to provide hydraulic power to hydraulic components of the work vehicle, the hydraulic power supply including vehicle side hydraulic fluid supply and return connections such that hydraulic power can also be provided to a work tool or other device;

wherein the electrically powered hydraulic power supply further comprises a tank configured to provide a reservoir of hydraulic fluid, an electrically powered hydraulic pump including a pump inlet and a pump outlet, an intake passage connecting the tank to the pump inlet, a supply passage connecting the pump outlet to the hydraulic components and to the vehicle side hydraulic fluid supply connection, a return passage connecting the tank to the hydraulic components and to the vehicle side hydraulic fluid return connection, and a heat exchanger disposed in the return passage so that hydraulic fluid returning from the vehicle side hydraulic fluid return connection to the tank passes through the heat exchanger and is cooled by the heat exchanger.

17. An electrically powered work vehicle, comprising:

a work vehicle frame;

a plurality of ground engaging units for supporting the work vehicle frame from a ground surface, at least one of the ground engaging units being powered by an electric drive motor to drive the vehicle;

an electrical power storage system carried by the work vehicle frame and connected to the electric drive motor to provide electrical power to the electric drive motor;

a work tool coupler carried by the work vehicle and configured to selectively interconnect the work vehicle with a coupler receiver of a selected one of a plurality of different work tools; and a vehicle side electrical connector carried by the work tool coupler and configured to transfer electrical power to the electrical power storage system to charge the electrical power storage system;

wherein vehicle side electrical connector is a wireless power transfer connector configured for capacitive power transfer.

* * * * *